US005137761A

United States Patent [19]

Altmayer

[11] Patent Number: 5,137,761

[45] Date of Patent: Aug. 11, 1992

[54] DECORATIVE PLAQUE

[75] Inventor: Andreas Altmayer, Mils, Austria

[73] Assignee: D. Swarovski & Co., Wattens, Austria

[21] Appl. No.: 670,943

[22] Filed: Mar. 18, 1991

[30] Foreign Application Priority Data

Mar. 16, 1990 [DE] Fed. Rep. of Germany ....... 4008556

[51] Int. Cl.[5] ........................... B44C 5/04; G02B 5/08

[52] U.S. Cl. ........................................ 428/13; 428/46; 428/428; 428/912.2; 428/913.3

[58] Field of Search ...................... 428/13, 38, 46, 428, 428/912.2, 913.3

[56] References Cited

U.S. PATENT DOCUMENTS 3,274,721 9/1966 Dreyer ................................. 40/152
4,052,863 10/1977 Poll ................................... 428/67 X
4,353,765 10/1982 Covi et al. ........................ 428/15 X
4,601,924 7/1986 Birkes et al. ...................... 428/13 X
4,604,876 8/1986 Hoffmann ......................... 428/15 X
4,767,676 8/1988 Swarovski et al. ............. 428/428 X
4,824,729 4/1989 Livi ..................................... 428/428

FOREIGN PATENT DOCUMENTS 654065 1/1986 Switzerland ................. 428/912.2 X

*Primary Examiner*—Henry F. Epstein
*Attorney, Agent, or Firm*—Bacon & Thomas

[57] ABSTRACT

A decorative plaque comprising, in sequence, from the outside to the inside, a semitransparent reflecting plate, a light transmitting glass plate spaced from the semi-transparent reflecting plate having a plurality of faceted glass stones affixed to one side thereof in an ornamental arrangement facing towards the reflective surface of the semi-transparent reflecting plate, and, on the opposite side of the light transmitting glass plate and spaced therefrom, a fully reflective plate. The plaque is arranged so that it is internally illuminated, for example by ambient light. Viewing of the interior of the plaque occurs through the semi-transparent reflecting plate.

8 Claims, 1 Drawing Sheet

DECORATIVE PLAQUE

BACKGROUND OF THE INVENTION

The present invention relates to a decorative plaque having a glass plate to which a plurality of faceted glass stones are fixed in an ornamental arrangement. Different kinds of decorative plaques are known, including ones with faceted glass stones provided on a transparent pane in an ornamental arrangement, as described in Swiss Pat. No. 654065.

However, there is a need to create new decorative plaques that are characterized by special optical and esthetic effects.

The invention is therefore based on the problem of providing new decorative plaques having special optical and esthetic effects.

BRIEF SUMMARY OF THE INVENTION

The invention is based on the finding that such new decorative plaques can be created by combining glass plates having small faceted glass stones in an ornamental arrangement, with reflecting plates.

The object of the invention is a decorative plaque having a light transmitting glass plate to which a plurality of faceted glass stones are fixed in an ornamental arrangement, that is characterized by the fact that the decorative plaque includes a semi-transparent reflecting plate, spaced from the glass plate with glass stones on one side thereof a fully reflecting mirror plate spaced away from the opposite side of the glass The special optical and esthetic effect of the inventive decorative plaque consists in the fact that the glittering small glass stones multiply into infinity due to the combination of the semi-transparent plate and the full mirror.

According to a preferred embodiment, the fully reflecting plate is disposed at a angle to the semi-transparent reflecting plate. This causes the multiplying effect to appear in the form of a curve.

According to a further preferred embodiment, one may dispose the rear full mirror so as to be movable, in such a way that its angle to the semi-transparent reflecting plate is variable. In this way one obtains a moving image.

According to a further preferred embodiment, a narrow side of the decorative plaque is designed in such a way that light passes onto the glass stones, thereby increasing the optical effect.

The inventive decorative plaques are suitable for a great variety of applications. They can have a strictly artistic design or function as advertising vehicles.

The decorative plaques can have any desired size, for example 50×100 mm or 100×200 mm.

The semi-transparent reflecting plate preferably is a glass plate with a semi-transparent mirror provided on the back, i.e. the light beams are partly reflected and partly let through.

The glass plate with glass stones spaced therebehind—at a distance that may vary within wide limits—has the glass stones in an ornamental arrangement, whereby no limits are set on the manifold possibilities.

The faceted glass stones are preferably cut glass stones made of lead crystal. Their size can vary within wide limits, for example between 0.3 and 10 mm. In terms of shape, chatons are particularly sutiable, but roses can also be used. The chatons are glued with the plaque onto the glass plate, that is to face the viewer. The stones are preferably colorless, but may also be made—optionally only partly—of brightly colored glass or be vacuum coated with metal layers.

The stones are glued to the glass plate with transparent adhesive, preferably a UV-hardening acrylic adhesive. The stones may be glued to the front or back of the glass plate.

The rear fully reflecting plate is a customary reflecting plate, the reflective layer generally being a silver layer.

The individual plates are preferably combined into a closed decorative plaque, in particular to protect the glass stones from being soiled.

The glass stones are preferably illuminated, in particular from the side.

The fully reflecting plate may be disposed at a small angle to the semi-transparent reflecting plate, both in the horizontal and in the vertical direction, whereby special optical effects are achieved.

One may also dispose the fully reflecting plate and the above-mentioned small angle ranges so as to be movable, thereby obtaining moving images.

BRIEF DESCRIPTION OF THE DRAWINGS

The invention shall be explained in more detail below with reference to the drawing showing an exemplary embodiment.

DETAILED DESCRIPTION

Figure 1:
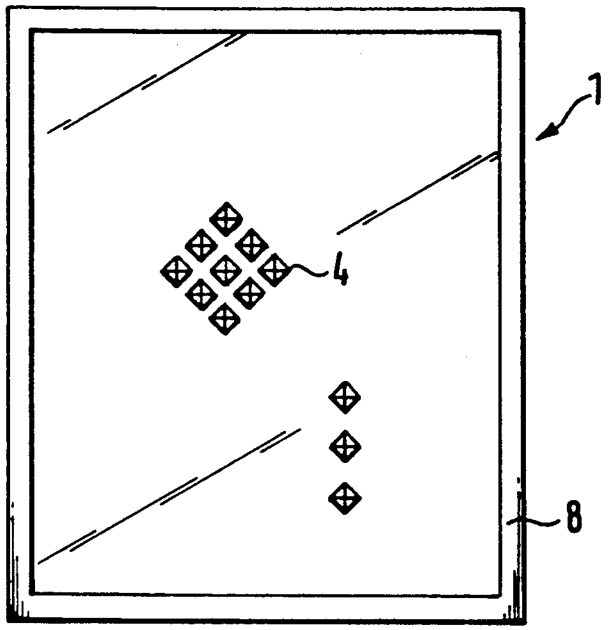
FIG. 1 shows a front view of a decorative plaque.

FIG. 1 shows decorative plaque 1 with an ornament consisting of a plurality of faceted glass stones 4. The decorative plaque is mounted in a frame 8.

Figure 2:
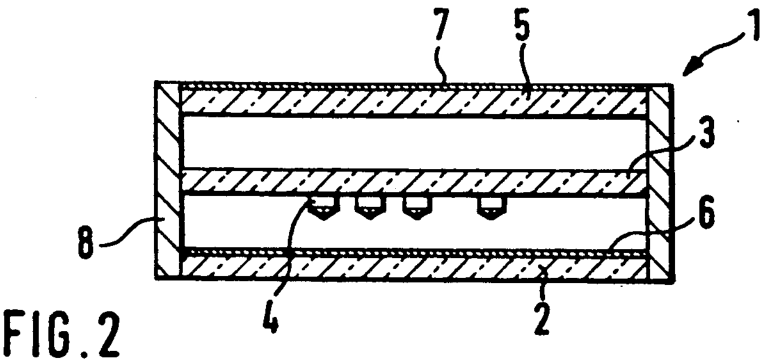
FIG. 2 shows a cross section through a decorative plaque on an enlarged scale.

As indicated by FIG. 2, the viewer is faced by semi-transparent reflecting plate 2 with semi-transparent reflecting layer 6 on its back. Spaced therebehind is light transmitting glass plate 3 to which glass stones 4 are fixed. Spaced therebehind is fully reflecting plate 5 with reflecting layer 7 on its back. All three plates are united by means of frame 8. According to a preferred embodiment, a narrow side or a part thereof is made of glass so that light can penetrate into the interior of decorative plaque 1.

I claim:

1. A decorative plaque comprising:

a light transmitting glass plate to which a plurality of faceted glass stones are fixed in an ornamental arrangement;

a semi-transparent reflecting plate disposed on one side of and spaced from the glass plate towards a point from where the plaque is normally viewed;

a fully reflective plate disposed on the opposite side of and spaced from the glass plate;

and means for maintaining said semi-transparent reflecting plate and said fully reflective plate spaced from said light transmitting glass plate.

2. A decorative plaque as claimed in claim 1, wherein the fully reflective plate is disposed at an angle to the semi-transparent reflecting plate.

3. A decorative plaque as claimed in claim 2, wherein the fully reflective plate is moveable.

4. A decorative plaque as claimed in claim 3, including means for illuminating the glass stones for a side of the plaque.

5. A decorative plaque as claimed in claim 2, including means for illuminating the glass stones from a side of the plaque.

6. A decorative plaque as claimed in claim 1, wherein the fully reflective plate is moveable.

7. A decorative plaque as claimed in claim 6, including means for illuminating the glass stones from a side of the plaque.

8. A decorative plaque as claimed in claim 1, including means for illuminating the glass stones from a side of the plaque.

* * * * *